United States Patent
Wang et al.

(10) Patent No.: US 11,995,606 B2
(45) Date of Patent: May 28, 2024

(54) METHOD FOR DETERMINE DISTRIBUTION POSITIONS OF COMMODITIES AND APPARATUS, ELECTRONIC DEVICE, AND STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Luguang Wang, Beijing (CN); Fan Li, Beijing (CN); Yuefeng Wu, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 874 days.

(21) Appl. No.: 17/040,660

(22) PCT Filed: Jan. 30, 2019

(86) PCT No.: PCT/CN2019/073839
§ 371 (c)(1),
(2) Date: Sep. 23, 2020

(87) PCT Pub. No.: WO2019/184590
PCT Pub. Date: Oct. 3, 2019

(65) Prior Publication Data
US 2021/0019909 A1 Jan. 21, 2021

(30) Foreign Application Priority Data
Mar. 28, 2018 (CN) .......................... 201810263625.5

(51) Int. Cl.
*G06Q 10/087* (2023.01)
*G06N 20/00* (2019.01)
(Continued)

(52) U.S. Cl.
CPC .......... *G06Q 10/087* (2013.01); *G06N 20/00* (2019.01); *G06T 7/73* (2017.01); *G06V 10/762* (2022.01);
(Continued)

(58) Field of Classification Search
CPC ...... G06Q 10/087; G06Q 30/02; G06Q 30/06; G06Q 30/0639; G06N 20/00; G06T 7/73;
(Continued)

(56) References Cited

U.S. PATENT DOCUMENTS

| | | | |
|---|---|---|---|
| 2012/0173303 A1* | 7/2012 | Li | G06Q 30/0202 705/7.31 |
| 2014/0100916 A1 | 4/2014 | Li et al. | |
| 2016/0203499 A1* | 7/2016 | Yamashita | G06V 20/52 705/7.29 |

FOREIGN PATENT DOCUMENTS

| CN | 102376061 A | 3/2012 |
|---|---|---|
| CN | 102567896 A | 7/2012 |

(Continued)

OTHER PUBLICATIONS

The ISR issued Apr. 28, 2019 by the WIPO.
(Continued)

*Primary Examiner* — Umair Ahsan
(74) *Attorney, Agent, or Firm* — Qinghong Xu

(57) ABSTRACT

A data processing method and apparatus, an electronic device, and a storage medium, relating to the field of computer technology. The method comprises: determining a coordinate order of each user according to video data (S110); obtaining a track of the user within a preset time (Continued)

interval according to the coordinate order (S120); determining, by means of the track, a relationship point of two shelves where the user stays (S130); and calculating, by means of the relationship point, a directional relationship diagram between shelves, so as to determine distribution positions of commodities in the shelves by means of the directional relationship diagram (S140).

10 Claims, 6 Drawing Sheets

(51) Int. Cl.
*G06Q 10/0631* (2023.01)
*G06T 7/73* (2017.01)
*G06V 10/762* (2022.01)
*G06V 40/20* (2022.01)

(52) U.S. Cl.
CPC ....... *G06V 40/20* (2022.01); *G06Q 10/06315* (2013.01); *G06T 2207/10016* (2013.01); *G06T 2207/30196* (2013.01)

(58) Field of Classification Search
CPC ........... G06T 2207/10016; G06T 2207/30196; G06V 10/762; G06V 40/20; G06F 18/23
See application file for complete search history.

(56) References Cited

FOREIGN PATENT DOCUMENTS

| | | | |
|---|---|---|---|
| CN | 106779940 | A | 5/2017 |
| CN | 106921945 | A | 7/2017 |
| CN | 107247759 | A | 10/2017 |
| CN | 107330735 | A | 11/2017 |
| CN | 107844990 | A | 3/2018 |
| JP | 2016206799 | A | 12/2016 |
| WO | 2015033577 | A1 | 3/2015 |

OTHER PUBLICATIONS

The 1st Office Action dated Sep. 7, 2021 for JP patent application No. 2020-551803.
1st Office Action dated Sep. 1, 2023 of Chinese Application No. 201810263625.5.

* cited by examiner

METHOD FOR DETERMINE DISTRIBUTION POSITIONS OF COMMODITIES AND APPARATUS, ELECTRONIC DEVICE, AND STORAGE MEDIUM

The present disclosure is based upon International Application No. PCT/CN2019/073839, filed on Jan. 30, 2019, which claims the priority to the Chinese Patent Application No. 2018102636255, entitled "DATA PROCESSING METHOD AND APPARATUS, ELECTRONIC DEVICE, AND STORAGE MEDIUM", filed on Mar. 28, 2018.

TECHNICAL FIELD

The present disclosure relates to the field of computer technologies, and in particular, to a data processing method, a data processing apparatus, an electronic device, and a computer-readable storage medium.

BACKGROUND

With an increase in varieties and quantity of commodities in large supermarkets, distribution positions of the commodities may affect sales and popularity of the commodities, and thus may also affect a transaction rate. Therefore, how to reasonably determine the distribution positions of the commodities is of great significance.

In the related art, supermarket staffs generally determine which shelf each commodity is placed on based on human experience and determine the distribution positions of the commodities in the shelf. For example, according to an order of volume from small to large, and an order of weight from light to heavy, the commodities are arranged in the shelf from top to bottom.

However, in this commodity distribution method, the staff needs to design the distribution positions of the commodities, which leads to a low efficiency. In addition, since there is no certain reference and calculation basis, planned commodity positions may be unreasonable; and planning the distribution positions of the commodities by manual experience may lead to longer time for consumers to purchase products, leading to lower commodity transaction rates.

It should be noted that the information disclosed in the Background section above is only for enhancing the understanding of the background of the present disclosure, and thus may include information that does not constitute prior art known to those of ordinary skill in the art.

SUMMARY

Other characteristics and advantages of the present disclosure will become apparent through the following detailed description, or partly learned by the practice of the present disclosure.

According to an aspect of the present disclosure, there is provided a data processing method, including: determining a coordinate order of each user according to video data; obtaining a track of the user within a preset time interval according to the coordinate order; determining relationship points of two shelves where the user stays by the track; and calculating a directional relationship diagram between shelves by the relationship points, so as to determine distribution positions of commodities in the shelves by the directional relationship diagram.

In an exemplary embodiment of the present disclosure, the step of obtaining a track of the user within a preset time interval according to the coordinate order includes: obtaining a total track of the user according to the coordinate order; and dividing the total track into a plurality of the tracks according to the preset time interval.

In an exemplary embodiment of the present disclosure, the step of determining relationship points of two shelves where the user stays by the track includes: analyzing the track by a clustering algorithm to obtain two pause points of the user; normalizing the pause points according to coordinates of the pause points and coordinates of the shelves to form a plurality of the relationship points associated with the two shelves.

In an exemplary embodiment of the present disclosure, the step of calculating a directional relationship diagram between shelves by the relationship point, so as to determine distribution positions of commodities in the shelves by the directional relationship diagram includes: forming the directional relationship diagram between the shelves by a proportion of the number of users of each of the plurality of the relationship points of the shelves; and determining the distribution positions of commodities by the directional relationship diagram.

In an exemplary embodiment of the present disclosure, the step of determining the distribution positions of commodities by the directional relationship diagram includes: analyzing the directional relationship diagram by using a ranking algorithm to determine the distribution positions of commodities.

In an exemplary embodiment of the present disclosure, wherein the step of analyzing the directional relationship diagram by using a ranking algorithm to determine the distribution positions of commodities includes: determining a flow ranking of each of the shelves by the directional relationship diagram; and determining the distribution positions of commodities in each of the shelves according to the flow ranking.

In an exemplary embodiment of the present disclosure, the step of determining a flow ranking of each of the shelves by the directional relationship diagram includes: determining a flow corresponding to each directional edge of the directional relationship diagram; calculating an actual flow of each of the shelves according to the flow corresponding to each directional edge, and obtaining the flow ranking according to the actual flow.

In an exemplary embodiment of the present disclosure, a calculation formula of the actual flow includes:
$F = a_1 \times b + a_2 \times c$, where $a_1 + a_2 = 1$, b is a flow of a shelf itself, and c is a flow flowing into a shelf.

In an exemplary embodiment of the present disclosure, the step of determining the distribution positions of commodities in each of the shelves according to the flow ranking includes: determining the flow ranking in a descending order; and determining the distribution positions of commodities in the shelves as preset positions when the flow ranking is greater than a preset value.

In an exemplary embodiment of the present disclosure, the method further includes: merging the commodities into the shelves with the flow ranking greater than the preset value, when the flow ranking is less than the preset value.

According to an aspect of the present disclosure, there is provided a data processing method, including: determining a coordinate order of each user according to video data; obtaining a track of the user within a preset time interval according to the coordinate order; determining relationship points of two shelves where the user stays by the track; and calculating a directional relationship diagram between shelves by the relationship point.

In an exemplary embodiment of the present disclosure, the step of determining relationship points of two shelves Where the user stays by the track includes: analyzing the track by a clustering algorithm to obtain two pause points of the user; normalizing the pause points according to coordinates of the pause points and coordinates of the shelves to form a plurality of the relationship points associated with the two shelves.

In an exemplary embodiment of the present disclosure, the step of calculating a directional relationship diagram between shelves by the relationship points includes: forming the directional relationship diagram between the shelves by a proportion of the number of users of each of the plurality of the relationship points of the shelves.

According to an aspect of the present disclosure, there is provided a data processing apparatus, including: a coordinate obtaining module, configured to determine a coordinate order of each user according to video data; a track obtaining module, configured to obtain a track of the user within a preset time interval according to the coordinate order; a relationship determination module, configured to determine relationship points of two shelves where the user stays by the track; and a position determination module, configured to calculate a directional relationship diagram between shelves by the relationship point, so as to determine distribution positions of commodities in the shelves by the directional relationship diagram.

According to an aspect of the present disclosure, there is provided a data processing apparatus, including: a coordinate obtaining module, configured to determine a coordinate order of each user according to video data; a track obtaining module, configured to obtain a track of the user within a preset time interval according to the coordinate order; a relationship determination module, configured to determine relationship points of two shelves where the user stays by the track; and a directional diagram calculation module, configured to calculate a directional relationship diagram between shelves by the relationship point.

According to an aspect of the present disclosure, there is provided an electronic device including: a processor; and a memory for storing executable instructions of the processor; wherein the processor is configured to execute the data processing method described in any one of the foregoing embodiments by executing the executable instructions.

According to an aspect of the present disclosure, there is provided a computer-readable storage medium, having a computer program stored thereon, wherein the computer program implements the data processing method according to any one of the foregoing embodiments when executed by a processor.

It should be noted that the above general description and the following detailed description are merely exemplary and explanatory and should not be construed as limiting of the disclosure.

DETAILED DESCRIPTION

Figure 1:
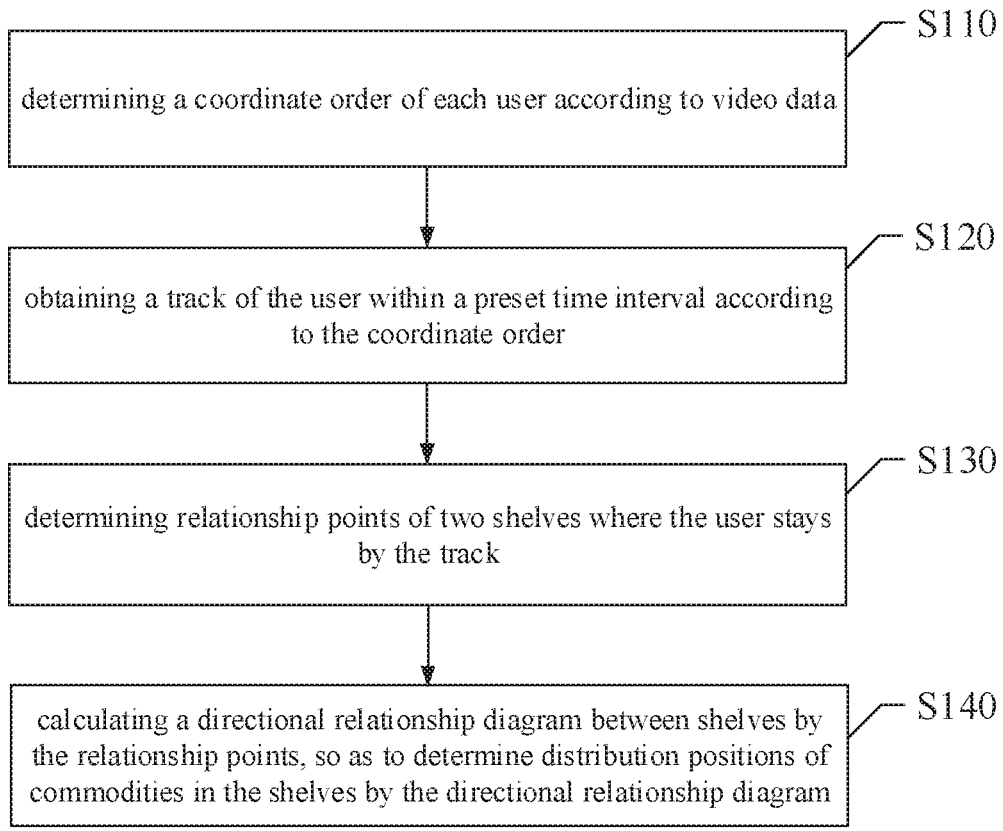
FIG. 1 schematically shows a schematic diagram of a data processing method in an exemplary embodiment of the present disclosure.

Exemplary embodiments will now be described more fully with reference to the accompanying drawings. However, the embodiments can be implemented in a variety of forms and should not be construed as being limited to the examples set forth herein; rather, these embodiments are provided so that the present disclosure will be more comprehensive and complete so as to fully convey the idea of the exemplary embodiments to those skilled in this art. The described features, structures, or characteristics may be combined in one or more embodiments in any suitable manner. In the following description, many specific details are provided to give a full understanding of the embodiments of the present disclosure. However, those skilled in the art will appreciate that the technical solution of the present disclosure may be practiced without one or more of the specific details, or other methods, components, apparatuses and steps and the like may be employed. In other instances, well-known technical solutions are not shown or described in detail to avoid obscuring various aspects of the present disclosure.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

The present exemplary embodiment first provides a data processing method, which can be applied to various physical shopping scenarios, such as shopping malls, unmanned supermarkets, or convenience stores, or the like. As shown in FIG. 1, the data processing method may include following steps:

in step S110, a coordinate order of each user is determined according to video data;

in step S120, a track of the user within a preset time interval is obtained according to the coordinate order;

in step S130, relationship points of two shelves where the user stays are determined by the track; and in step S140, a directional relationship diagram between shelves is calculated by the relationship point, so as to determine distribution positions of commodities in the shelves by the directional relationship diagram.

In the data processing method provided in the exemplary embodiment, on the one hand, the directional relationship diagram between shelves can be determined by the coordinate order, so as to reasonably plan the distribution positions of commodities and improve the efficiency of determining the distribution positions of commodities; on the other hand, the distribution positions of commodities can be reasonably planned by the directional relationship diagram, so that the user can quickly find the commodities needed, thereby increasing the commodity transaction rate and user satisfaction.

Next, the data processing method in the exemplary embodiment will be further explained in conjunction with the drawings.

In the step S110, a coordinate order of each user is determined according to video data.

In this example, a detection scene being a supermarket is taken as an example for illustration. The video data refers to video data of multiple users in the supermarket within a certain period of time, and can specifically include display conditions of commodities in the supermarket, entry times, departure times and stay durations of the multiple users, etc. The video data can be collected by cameras set anywhere in the supermarket. The users can be all users who enter the supermarket or all users who purchase the commodities. In order to make results more accurate, the users who purchase the commodities are used as samples for illustration herein. The coordinate order herein refers to a result of arranging position coordinates of all users according to a preset rule, and the preset rule may be, for example, an order from small to large in time or other rules.

Specifically, data related to the positions of all users can be extracted from the collected video data to obtain the position coordinates of all users within a preset time interval; next, the position coordinates of each user can be arranged in the order from small to large in time to obtain the coordinate order of each user. By obtaining the coordinate order of each user, accuracy of subsequent calculations can be ensured, and the subsequent calculation processes can be facilitated.

In the step S120, a track of the user within a preset time interval is obtained according to the coordinate order.

In this example, the preset time interval can be set according to actual needs, but in order to make an analysis result more accurate, the preset time interval can be set to a small value. Specifically, when the track of the user within a preset time interval is to be obtained according to the coordinate order, total tracks of all users are first obtained according to the coordinate order. For example, the video data of a supermarket a in a certain day can be obtained, the position coordinates of all users are obtained according to the video data, and the position coordinates are arranged in the order from small to large in time to obtain a coordinate order 1 of the user 1, a coordinate order 2 of the user 2 and so on. Next, the coordinate orders are connected in sequence to obtain the total track of each user in the supermarket a in a certain day. For example, the total track 1 of the user 1 is obtained according to the coordinate order 1, and the total track 2 of the user 2 is obtained according to the coordinate order 2. It should be noted that the total tracks of different users can be the same or completely overlap, or can be different or only partially overlap.

Next, the obtained total track can be divided into a plurality of the tracks according to the preset time interval. For example, by analyzing the position coordinates and time information of all users in the supermarket a in a certain day, an average stay time of each user at a position can be obtained; then, the average stay time of the position can be used as a reference, and the total track of each user is split according to the preset time interval to obtain a plurality of tracks. For example, when the average stay time is 1.57 minutes, the preset time interval can be set to 3 minutes; when the average stay time is 2.45 minutes, the preset time interval can be set to 5 minutes. Herein, the preset time interval of 3 minutes is taken as an example for illustration. By obtaining the user's track within a preset time interval, the accuracy of the analysis can be improved.

In the step S130, relationship points of two shelves where the user stays are determined by the track.

In this example, the shelves may include, for example, shelves in the supermarket or areas for placing items with the same function. Herein, the shelves in the supermarket are taken as an example for description. The relationship points can be understood as all shelves connected to each shelf where the user stays. Specifically, the step of determining relationship points of two shelves where the user stays by the track includes: analyzing the track by a clustering algorithm to obtain two pause points of the user; normalizing the pause points according to coordinates of the pause points and coordinates of the shelves to form a plurality of the relationship points associated with the two shelves.

The clustering algorithm herein can be a density clustering algorithm in which the guiding idea is that as long as a density of a certain point is greater than a certain threshold, the point is added into a nearest cluster. DBSCAN (Density-Based Spatial Clustering of Applications with Noise) is taken as an example for illustration. The specific process thereof generally includes: if a point p contains more than m objects, a new cluster with the p as a core object is created; next, objects which are directly density-reachable the core object are found and merged; if there is no new point to update the cluster, the algorithm ends. For example, if the position X and the position Y on the track 1 corresponding to the user 1 contain more than m objects, the position X and the position Y can be used as new clusters as the two pause points of the user 1 described in this example, which specifically can be achieved by writing or calling a Python program. In addition, other clustering algorithms, such as hierarchical clustering algorithms or other machine learning algorithms, can be used to determine the two pause points where the user stays on the track according to the track corresponding to the preset time interval, and a direction of the two pause points is from the position X to the position Y.

Next, the obtained two pause points can be normalized according to the coordinates of the pause points and the coordinates of the shelves to form a plurality of relationship points associated with the two shelves. The normalization processing herein can be used for reducing data redundancy while maintaining data integrity. Prior to this, the positions of all the shelves in the supermarket a can be coordinated based on a certain ratio according to a plan view of all the shelves in the supermarket a. In order to ensure the accuracy of the analysis, the pause points can be normalized by using a distance formula between two points according to the coordinates of the pause points and the coordinates of the shelves. For example, the two pause points can be normalized by using $|XY|=\sqrt{(x1-x2)^2+(y1-y2)^2}$ according to the coordinates of the pause points (namely, the coordinates (x1, y1) of position X, the coordinates (x2, y2) of position Y) and the coordinates of the shelves.

Figure 2:
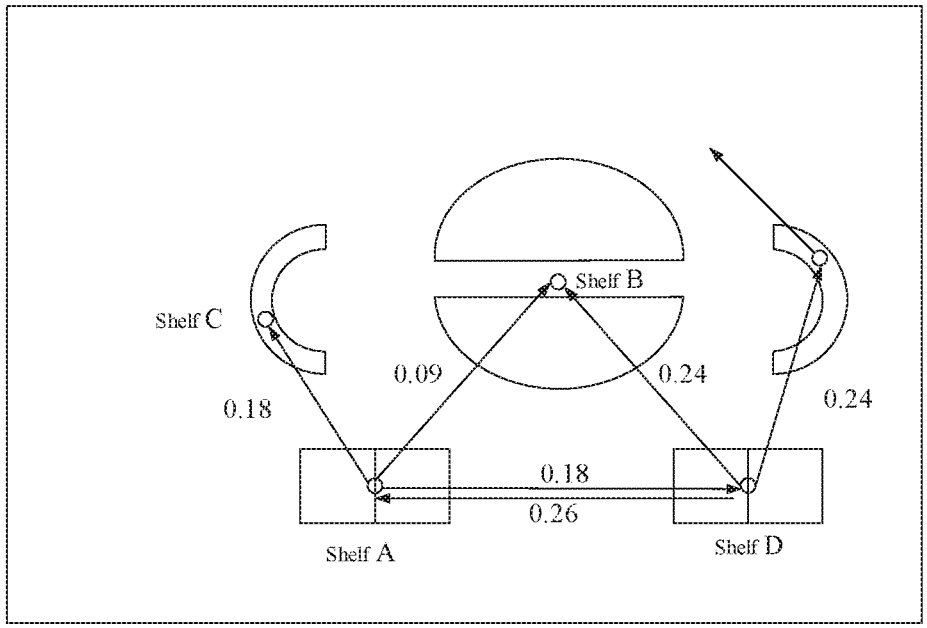
FIG. 2 schematically shows a schematic diagram of a plan view of shelves in an exemplary embodiment of the present disclosure.

After the stop point is normalized, multiple shelves associated with the two shelves corresponding to the pause points can be formed. As shown in FIG. 2, according to the pause points, it is determined that the two shelves that user 1 stays in a first preset time interval are shelf A and shelf B, and the shelf associated with the shelf A in a second preset time interval includes shelf C, the shelf associated with the shelf A in a third preset time interval includes shelf D. Then the shelf B, shelf C, and shelf D can be determined as the relationship points of the shelf A. Similarly, it can be determined that all the relationship points of shelf B are shelf A and shelf D.

In this example, the relationship points of all shelves can be determined by detecting the pause points in the tracks of all users in the scene, which reduces the amount of calculation and improves the efficiency and convenience of determining the relationship points.

In the step S140, a directional relationship diagram between shelves is calculated by the relationship point, so as to determine distribution positions of commodities in the shelves by the directional relationship diagram.

In this example, after the relationship points associated with each shelf are obtained, the directional relationship diagram between each shelf can be calculated by all the relationship points. The directional relationship diagram here can be used for describing the relationship points of each shelf. Since the directional relationship diagram represents the internal relationships between the commodities in the shelf, corresponding adjustments can be made to the commodities according to the directional relationship diagram. In addition, a direction of each edge of the directional relationship diagram can be used for describing the change of the user's track or the pause point within the preset time interval. Further, the commodities in each shelf can be arranged by the directional relationship diagram to reasonably determine their distribution positions, so as to achieve the purpose of providing a basis for planning the positions of commodities in the physical supermarkets or other detection scenarios. The commodities refer to the popular hot-selling commodities or ordinary commodities located in the shelf.

Specifically, when the distribution positions of commodities in the shelves are determined by the directional relationship diagram, the directional relationship diagram between the shelves is formed by a proportion of the number of users of each of the plurality of the relationship points of the shelves; and then the distribution positions of commodities are determined by the directional relationship diagram. For example, the number of users corresponding to the relationship points associated with each shelf can be determined, and then the corresponding number proportion can be calculated by the number of users of each relationship point, so as to obtain the directional relationship diagram between the shelves.

For example, by calculating the ratio of the number of users corresponding to each relationship point associated with the shelves to the total number of users in the supermarket a during the detection time, the number proportion of each shelf and the number of relationship points can be obtained. Refer to FIG. 2, the number of users between shelf A and shelf A is 218, the number of users between shelf A and shelf B is 36, the number of users between shelf A and shelf C is 72, and the number of users between shelf A and shelf D is 72, and then the number proportions of shelf A and individual relationship points can be determined, respectively, so as to obtain the directional relationship diagram between all the shelves in the supermarket. The distribution position of the commodities in each shelf is further reasonably determined through the directional relationship diagram.

The step of determining the distribution positions of commodities by the directional relationship diagram includes: analyzing the directional relationship diagram by using a ranking algorithm to determine the distribution positions of commodities. The ranking algorithm may be, for example, a PageRank algorithm whose basic idea is to calculate the PageRank value of each webpage, and then rank importance of webpages according to magnitudes of values. The PageRank algorithm is applied in this example, and when the user randomly selects the commodity, a shelf is randomly selected first, and then after staying on this shelf for 1 minute, the user move to another shelf associated with the shelf. At this time, a probability of the user staying in each shelf can be estimated by the PageRank algorithm. The directional relationship diagram is analyzed by the ranking algorithm, which can increase the calculation speed, and then quickly assist the merchant to determine the distribution positions of commodities in each shelf.

On this basis, a flow ranking of each of the shelves can be determined by the directional relationship diagram. The flow ranking refers to a result obtained by arranging the proportion of the number of users corresponding to each relationship point associated with the shelves from large to small or from small to large. Specifically, a flow corresponding to each directional edge of the directional relationship diagram can be determined; an actual flow of each of the shelves is calculated according to the flow corresponding to each directional edge, and the flow ranking is obtained according to the actual flow.

In other words, for each shelf, it is connected to at least one different shelf. Two shelves that are connected to each other and have a direction constitute one directional edge, and each directional edge corresponds to one proportion of the number of users, and the proportion of the number is the flow of each directional edge. For each shelf, there may be both a flow flowing into the shelf, and a flow flowing from this shelf to another shelf, and also the flow of the shelf itself. Therefore, the actual flow of each shelf is also determined by three parts: inflow, outflow, and own flow. For example, a calculation formula for the actual flow rate can be: $F = a1 \times b \times a2 \times c$, where F is is the calculated actual flow of the shelf, a1 is a first parameter, and a2 is a second parameter, and $a1+a2=1$, b is a flow of a shelf itself, and c is a flow flowing into a shelf.

For example, the calculated flows from shelf A to shelf A, shelf A to shelf B, shelf A to shelf C, and shelf A to shelf D are 0.54, 0.09, 0.18, 0.18, respectively; in addition, the flow from shelf D to shelf A is 0.26, and the flow from shelf D to shelf B is 0.24. The calculated flow of shelf A itself is $1-(0.18+0.09+0.18)=0.55$, the flow into shelf A is 0.26 from shelf D to shelf A, the first parameter a1 and the first parameter a2 in the actual flow calculation formula can be set according to actual needs, for example, a1 can be set to 0.85, and a2 can be set to 0.15. Then the actual flow of shelf A calculated according to the above formula is 0.51. In the same way, the actual flow of all shelves can be calculated.

It should be noted that if it is not possible to calculate the self-flow of the shelf based on the flow of each directional edge of the directional relationship diagram, the self-flow can be the default flow, and the default flow is $b=1/h$, where h is the total number of the shelves in the supermarket.

Next, after the actual flow of each shelf is calculated, all the actual flows can be arranged according to the actual flow in a descending order to obtain the final flow ranking. In other words, the higher the flow ranking, the greater the number of users in the shelf.

When the flow ranking is greater than the preset value, it is determined that the distribution position of the commodity in the shelf is the preset position. The preset value can be set according to actual needs such as the total number of shelves. For example, when the total number of shelves is 20, the preset value can be set to 15. When the flow ranking is greater than 15, that is, when the flow ranking is ranked in the top 15 from large to small, the commodity can be set in the preset position of the shelf. The preset position may be, for example, a prominent position of the shelf or a position that is easy for the user to see, such as the second row of the shelf.

In addition, when the flow ranking is less than the preset value, the commodity is merged into the shelf with the flow ranking greater than the preset value. That is to say, if the flow ranking is less than 15, that is, when the flow ranking is ranked 16th to the 20th in a descending order, the commodities on the corresponding preset area can be removed or merged into the shelf with the flow ranking in the top 15. For example, the commodities in the shelves with the flow ranking ranked the 16th to the 20th in a descending order can be removed, or be merged into the shelves with a higher flow ranking.

In this example, the directional relationship diagrams of all shelves can be determined by the stay points of the tracks of all buyers in the supermarket, so that the flow ranking of each shelf can be determined according to the directional relationship diagram, and then the distribution positions of commodities can be quickly determined according to the flow ranking. It can reasonably determine the positions of commodities based on the directional relationship diagram to increase the attention of the product; and it can also enable the merchant to make adjustments to the commodities in the shelves with low flow rankings, such as removing commodities with low flow rankings or merging the commodities, thereby improving the transaction rate and transaction efficiency; it can also make it easy for buyers to find the commodities they need, thereby improving user satisfaction; in addition, it can alleviate the congestion of merchants and improve the throughput per unit time in the supermarket.

Figure 3:
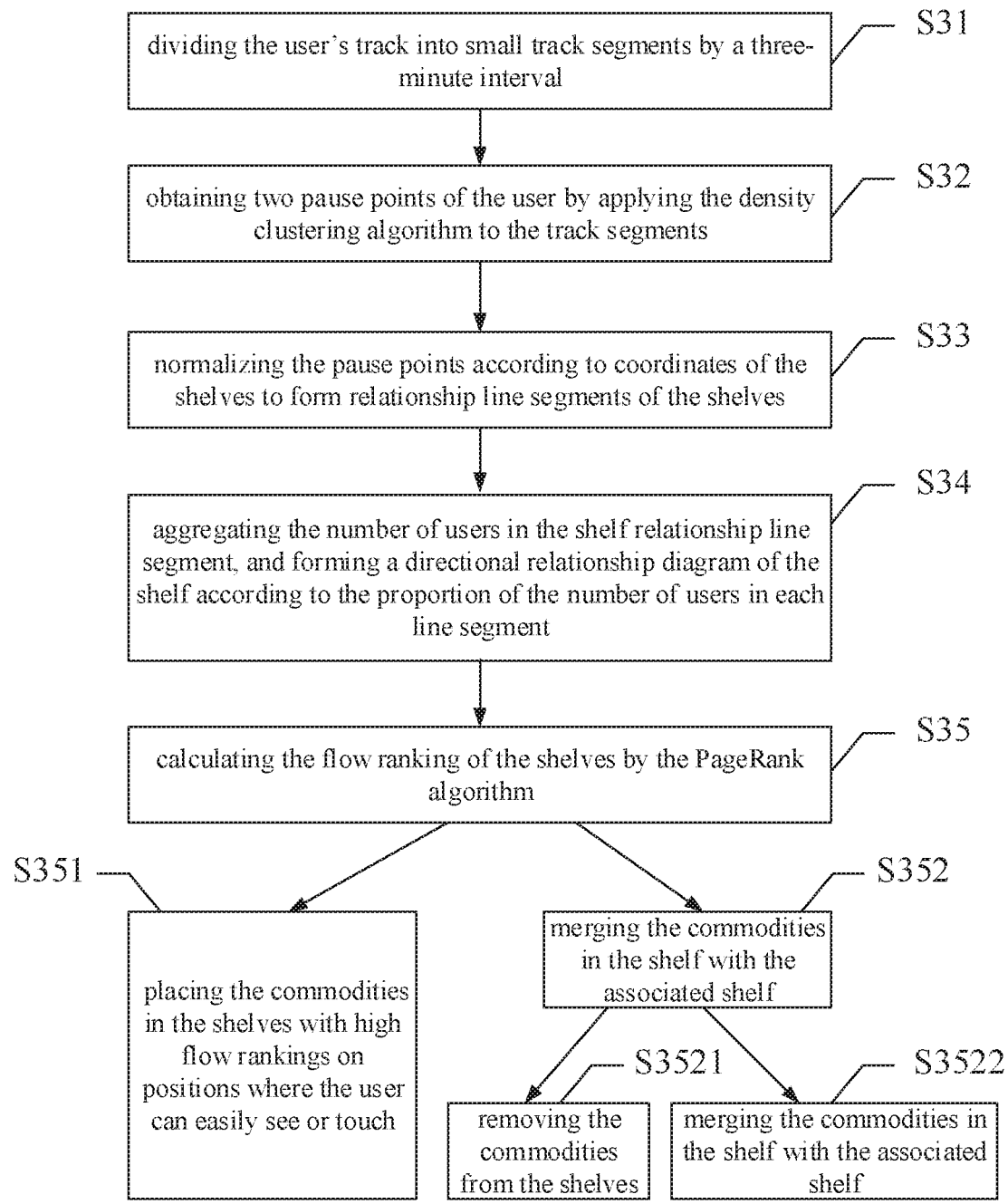
FIG. 3 schematically shows a specific flowchart of data processing in an exemplary embodiment of the present disclosure.

FIG. 3 shows a specific flowchart of determining a position of a commodity. With reference to FIG. 3, the process specifically includes:

in step S31, the user's track is divided into small track segments by a three-minute interval;

in step S32, two pause points of the user are obtained by applying the density clustering algorithm to the track segments;

in step S33, the pause points are normalized according to coordinates of the shelves to form relationship line segments of the shelves; the shelf is, for example, a rack;

in step S34, the number of users in the shelf relationship line segment is aggregated, and a directional relationship diagram of the shelf is formed according to the proportion of the number of user in each line segment; the user may be, for example, a user who purchases goods;

in step S35, the flow ranking of the shelves is calculated by the PageRank algorithm;

in S351, the commodities in the shelves with high flow rankings are placed on positions where the user can easily see or touch; the commodities are, for example, hot-selling goods;

in S352, the commodities in the shelves with low flow rankings are handled according to S3521 or S3522;

in S3521, the commodities are removed from the shelves;

in S3522, the commodities in the shelf are merged with the shelf with the high flow ranking associated with this shelf on the directional relationship diagram.

Through the steps shown in FIG. 3, the distribution positions of the commodities in the shelves can be quickly and reasonably determined, thereby improving the commodity transaction rate and user satisfaction.

Figure 4:
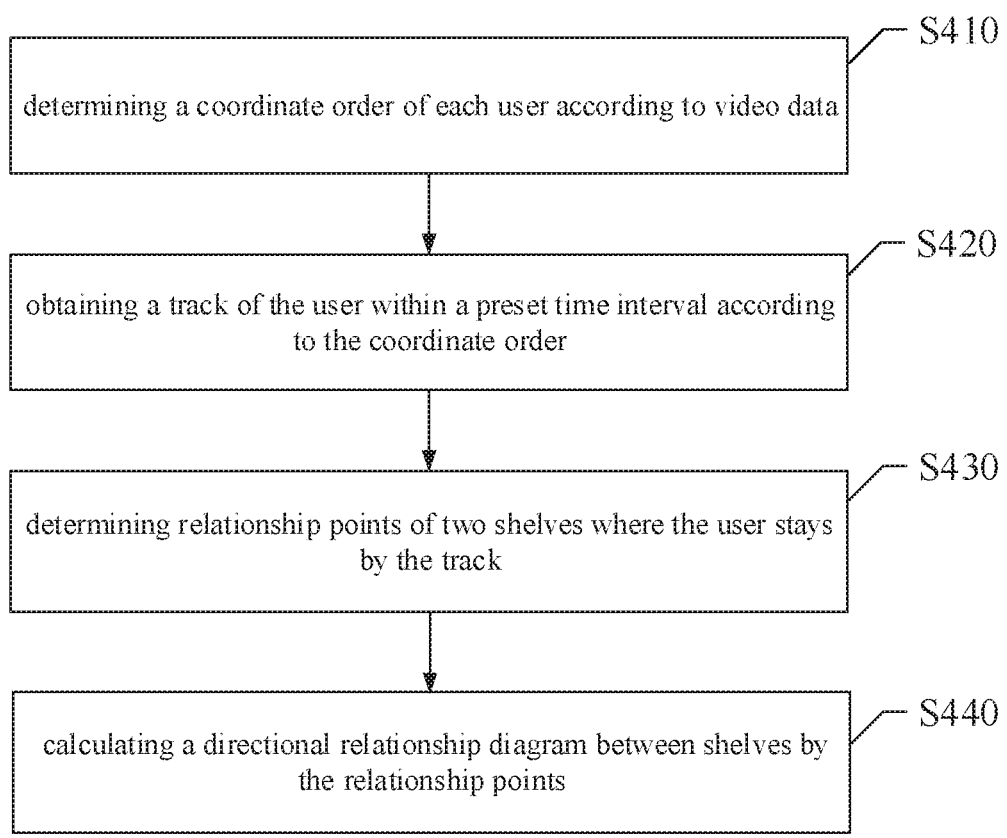
FIG. 4 schematically shows a schematic diagram of another data processing method in an exemplary embodiment of the present disclosure.

In addition, this example also provides another data processing method. As shown in FIG. 4, the data processing method may include the following steps:

in step S410, a coordinate order of each user is determined according to video data;

in step S420, a track of the user within a preset time interval is obtained according to the coordinate order;

in step S430, relationship points of two shelves where the user stays are determined by the track; and in step S140, a directional relationship diagram between shelves is calculated by the relationship point.

In this example, the step of determining relationship points of two shelves where the user stays by the track includes: analyzing the track by a clustering algorithm to obtain two pause points of the user; normalizing the pause points according to coordinates of the pause points and coordinates of the shelves to form a plurality of the relationship points associated with the two shelves.

In this example, the step of calculating a directional relationship diagram between shelves by the relationship points includes: forming the directional relationship diagram between the shelves by a proportion of the number of users of each of the plurality of the relationship points of the shelves.

It should be noted that in this example, a coordinate order of each user is determined according to video data, a track of the user within a preset time interval is obtained according to the coordinate order, and a directional relationship diagram between shelves is calculated by the relationship point of two shelves where the user stays, and the specific processes of the above steps have been described in details in the step S110 to step S140, which will not be repeated here.

Figure 5:
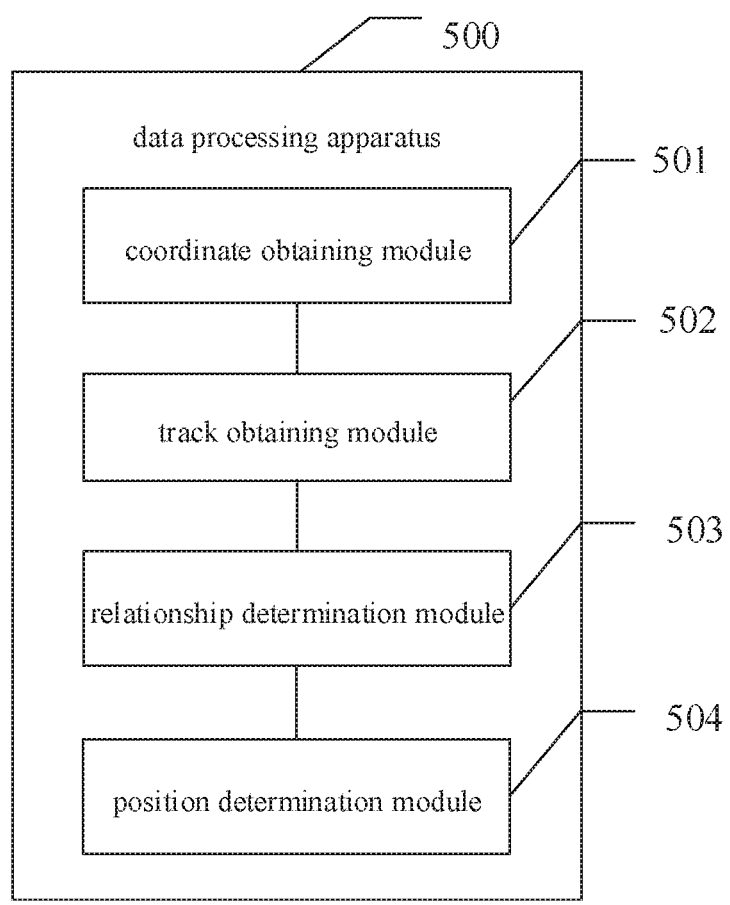
FIG. 5 schematically shows a block diagram of a data processing apparatus in an exemplary embodiment of the present disclosure.

The present disclosure also provides a data processing apparatus. Referring to FIG. 5, the data processing apparatus 500 may include:

a coordinate obtaining module 501 configured to determine a coordinate order of each user according to video data;

a track obtaining module 502 configured to obtain a track of the user within a preset time interval according to the coordinate order;

a relationship determination module 503 configured to determine relationship points of two shelves where the user stays by the track; and a position determination module 504 configured to calculate a directional relationship diagram between shelves by the relationship point, so as to determine distribution positions of commodities in the shelves by the directional relationship diagram.

Figure 6:
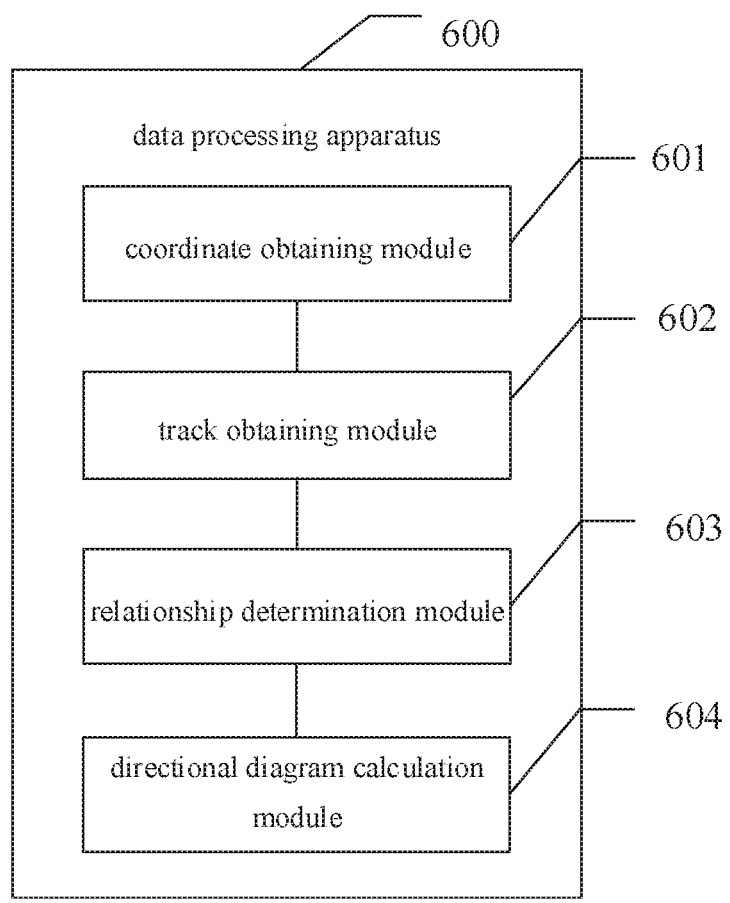
FIG. 6 schematically shows a block diagram of another data processing apparatus in an exemplary embodiment of the present disclosure.

In addition, the present disclosure also provides a data processing apparatus. As shown in FIG. 6, the data processing apparatus 600 may include:

a coordinate obtaining module 601 configured to determine a coordinate order of each user according to video data;

a track obtaining module 602 configured to obtain a track of the user within a preset time interval according to the coordinate order;

a relationship determination module 603 configured to determine relationship points of two shelves where the user stays by the track; and a directional diagram calculation module 604 configured to calculate a directional relationship diagram between shelves by the relationship point.

It should be noted that the specific details of each module in the above-mentioned data processing apparatus have been described in detail in the corresponding data processing method, and therefore will not be repeated here.

It should be noticed that, although several modules or units of apparatus for action execution are mentioned in the detailed description above, such division is not mandatory. Indeed, according to embodiments of the present disclosure, the features and functions of two or more modules or units described above may be embodied in one circuit or unit. Conversely, the features and functions of one of the modules or units described above may be further divided into a plurality of modules or units to be embodied.

In addition, although various steps of the methods in the present disclosure are described in a specific order in the accompanying drawings, this is not required or implied that the steps must be performed in this specific order, or a desired result may be realized only by performing all the steps shown. Additionally or alternatively, certain steps may be omitted, a plurality of steps may be combined into one step for execution, and/or one step may be decomposed into a plurality of steps for execution, and the like.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to cause a computing device (which may be a personal computer, a server, a terminal apparatus, or a network device, etc.) to perform the methods according to embodiments in the present disclosure.

In an exemplary embodiment of the present disclosure, there is provided an electronic device capable of implementing the above method.

Those skilled in the art may understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination of hardware and software, which may be collectively referred to herein "circuit", "module", or "system".

The electronic device 700 according to this embodiment of the present disclosure is described below with reference to FIG. 7. The electronic device 700 shown in FIG. 7 is merely an example, and should not impose any limitation on the functions and scope of use of the embodiment of the present disclosure.

Figure 7:
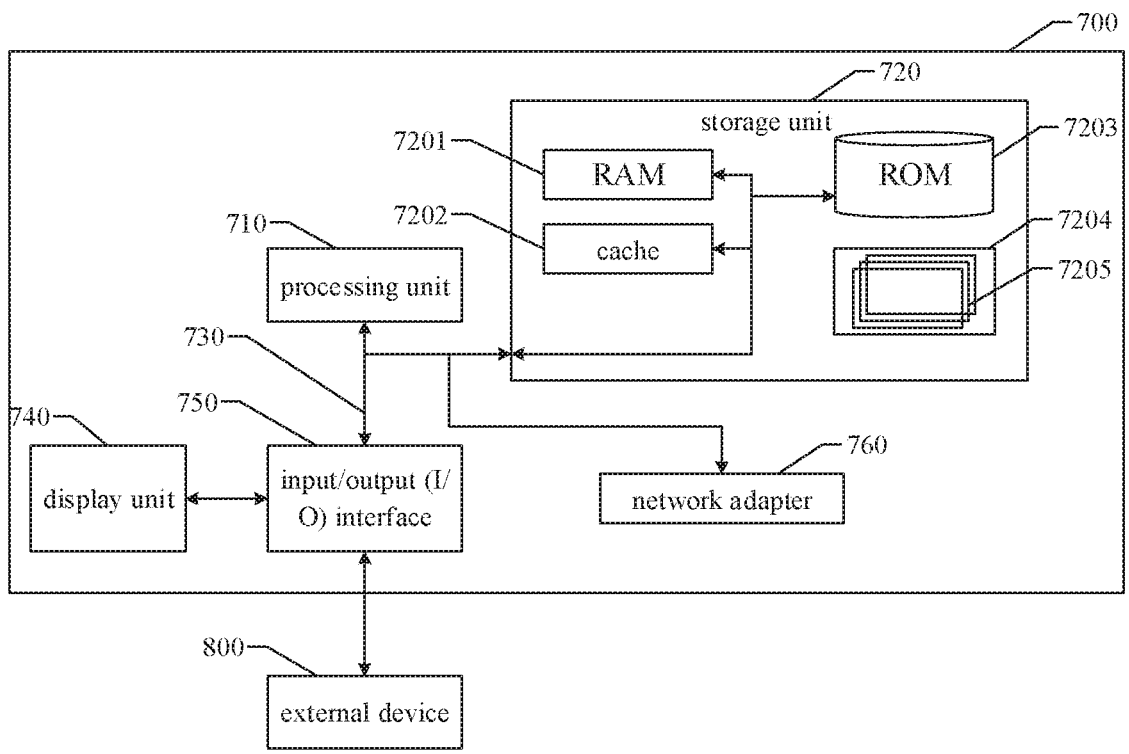
FIG. 7 schematically shows a block diagram of an electronic device in an exemplary embodiment of the present disclosure.

As shown in FIG. 7, the electronic device 700 is expressed in the form of a general-purpose computing device. The components of the electronic device 700 may include, but are not limited to, at least one processing unit 710, at least one storage unit 720, and a bus 730 connecting different system components (including the storage unit 720 and the processing unit 710).

In the example above, the storage unit stores program codes, and the program codes may be executed by the processing unit 710, so that the processing unit 710 executes various steps of the exemplary embodiments according to the present disclosure described in the above-mentioned "exemplary method" in the specification. For example, the processing unit 710 may perform the above steps shown in FIG. 1: in step S110, a coordinate order of each user is determined according to video data; in step S120, a track of the user within a preset time interval is obtained according to the coordinate order; in step S130, relationship points of two shelves where the user stays are determined by the track; and in step S140, a directional relationship diagram between shelves is calculated by the relationship point, so as to determine distribution positions of commodities in the shelves by the directional relationship diagram. In addition, the processing unit 710 may also perform steps S410 to S440 as shown in FIG. 4.

The storage unit 720 may include a readable medium in the form of a volatile storage unit, such as a random access storage unit (RAM) 7201 and/or a cache storage unit 7202, and may further include a read-only storage unit (ROM) 7203.

The storage unit 720 may further include a program/utility tool 7204 having a set of (at least one) program modules 7205. Such program modules 7205 include, but are not limited to, an operating system, one or more application programs, other program modules, and program data. Each or some combination of these examples may include an implementation of a network environment.

The bus 730 may be one or more of several types representing bus structures, including a storage unit bus or a storage unit controller, a peripheral bus, a graphics acceleration port, a processing unit, or a local bus that uses any bus structure in a variety of bus structures.

The electronic device 700 may also communicate with one or more external devices 800 (such as a keyboard, pointing device, Bluetooth device, etc.), may also communicate with one or more devices that enable a user to interact with the electronic device 700, and/or with any device (e.g., router, modem, etc.) that enables the electronic device 700 to communicate with one or more other computing devices. This communication may be performed through an input/output (I/O) interface 750. Moreover, the electronic device 700 may also communicate with one or more networks (such as a local area network (LAN), a wide area network (WAN), and/or a public network, such as the Internet) through the network adapter 760. As shown, the network adapter 760 communicates with other modules of the electronic device 700 through the bus 730. It should be understood that although not shown in the figure, other hardware and/or software modules may be used in conjunction with the electronic device 700, including but not limited to: microcode, device drivers, redundant processing units, external disk drive arrays, RAID systems, tape drives, data backup storage systems and the like.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to cause a computing device (which may be a personal computer, a server, a terminal apparatus, or a network device, etc.) to perform the methods according to embodiments in the present disclosure.

In an exemplary embodiment of the present disclosure, there is also provided a computer-readable storage medium on which a program product capable of implementing the above-mentioned method of the present specification is stored. In some possible implementation manners, aspects of the present disclosure may also be implemented in the form of a program product, which includes program code. When the program product runs on a terminal device, the program code is used to cause the terminal device perform the steps according to various exemplary embodiments of the present disclosure described in the above-mentioned "exemplary method" section of this specification.

Figure 8:
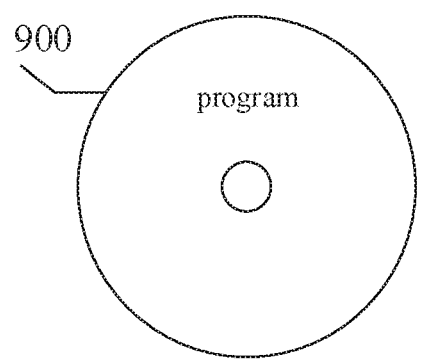
FIG. 8 schematically shows a program product in an exemplary embodiment of the present disclosure.

Referring to FIG. 8, a program product 900 for implementing the above method according to an embodiment of the present disclosure is described. The program product 800 can use a portable compact disc read-only memory (CD-ROM) and include the program code, which may run on a terminal device, for example, on a personal computer. However, the program product of the present disclosure is not limited thereto. In this document, the readable storage medium may be tangible medium containing or storing programs, and the program may be used by or in combination with an instruction execution system, an apparatus, or a device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as a part of a carrier wave, which carries readable program codes. Such a propagated data signal may take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, including but not limited to wireless, wired, optical cable, RF, etc., or any suitable combination of the foregoing.

The program code for performing the operations of the present disclosure may be written in any combination of one or more programming languages, which include object-oriented programming languages, such as Java, C++, etc. and further include conventional procedural programming language, such as "C" or a similar programming language. The program code may be executed entirely or partly on the user computing device, may be executed as an independent software package, may be executed partly on the user computing device and partly on the remote computing device, or may be executed entirely on the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

In addition, the above-mentioned drawings are merely a schematic description of processes included in the method of the exemplary embodiment of the present disclosure, and are not intended to limit the purpose. It is easy to understand that the processes shown in the above drawings do not indicate or limit the chronological order of these processes. In addition, it is also easy to understand that these processes may be performed synchronously or asynchronously in a plurality of modules, for example.

Other embodiments of the present disclosure will be apparent to those skilled in the art after consideration of the specification and practice of the present disclosure disclosed here. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

What is claimed is:

1. A method for determining distribution positions of commodities, comprising:

determining a coordinate order of each user according to video data;

obtaining a track of the user within a preset time interval according to the coordinate order;

determining relationship points of two shelves where the user stays by the track; and calculating a directional relationship diagram between shelves by the relationship points, so as to determine distribution positions of commodities in the shelves by the directional relationship diagram, wherein the determining relationship points of two shelves where the user stays by the track comprises:

analyzing the track by a clustering algorithm to obtain two pause points of the user; and normalizing the pause points according to coordinates of the pause points and coordinates of the shelves, to form a plurality of the relationship points associated with the two shelves, wherein the calculating a directional relationship diagram between shelves by the relationship point, so as to determine distribution positions of commodities in the shelves by the directional relationship diagram comprises:

forming the directional relationship diagram between the shelves by a proportion of the number of users of each of the plurality of the relationship points of the shelves; and determining the distribution positions of commodities by the directional relationship diagram, wherein the determining a flow ranking of each of the shelves by the directional relationship diagram comprises:

determining a flow corresponding to each directional edge of the directional relationship diagram; and calculating an actual flow of each of the shelves according to the flow corresponding to each directional edge, and obtaining the flow ranking according to the actual flow, wherein a calculation formula of the actual flow comprises:

$F = a1 \times b + a2 \times c,$ where $a1+a2=1$, b is a flow of a shelf itself, and c is a flow flowing into a shelf.

2. The method according to claim 1, wherein the determining the distribution positions of commodities by the directional relationship diagram comprises:
analyzing the directional relationship diagram by using a ranking algorithm, to determine the distribution positions of commodities.

3. The method according to claim 2, wherein the analyzing the directional relationship diagram by using a ranking algorithm to determine the distribution positions of commodities comprises:
determining a flow ranking of each of the shelves by the directional relationship diagram; and
determining the distribution positions of commodities in each of the shelves according to the flow ranking.

4. The method according to claim 3, wherein the determining the distribution positions of commodities in each of the shelves according to the flow ranking comprises:
determining the flow ranking in a descending order; and
determining the distribution positions of commodities in the shelves as preset positions when the flow ranking is greater than a preset value.

5. The method according to claim 4, wherein the method further comprises:
merging the commodities into the shelves with the flow ranking greater than the preset value, when the flow ranking is less than the preset value.

6. The method according to claim 1, wherein the obtaining a track of the user within a preset time interval according to the coordinate order comprises:
obtaining a total track of the user according to the coordinate order; and
dividing the total track into a plurality of tracks according to the preset time interval.

7. A non-transitory computer-readable storage medium, having a computer program stored thereon, wherein the computer program implements the method for determining distribution positions of commodities according to claim 1 when executed by a processor.

8. The non-transitory computer-readable storage medium according to claim 7, wherein the computer program is further configured to implement:
obtaining a total track of the user according to the coordinate order; and
dividing the total track into a plurality of tracks according to the preset time interval.

9. The non-transitory computer-readable storage medium according to claim 7, wherein the computer program is further configured to implement:
analyzing the directional relationship diagram by using a ranking algorithm, to determine the distribution positions of commodities.

10. An apparatus for determining distribution positions of commodities, comprising:
a processor; and
a memory for storing executable instructions of the processor,
wherein the processor is configured to:
determine a coordinate order of each user according to video data;
obtain a track of the user within a preset time interval according to the coordinate order;
determine relationship points of two shelves where the user stays by the track; and
calculate a directional relationship diagram between shelves by the relationship point, so as to determine distribution positions of commodities in the shelves by the directional relationship diagram,
wherein the processor is further configured to:
analyze the track by a clustering algorithm to obtain two pause points of the user; and
normalize the pause points according to coordinates of the pause points and coordinates of the shelves, to form a plurality of the relationship points associated with the two shelves,
form the directional relationship diagram between the shelves by a proportion of the number of users of each of the plurality of the relationship points of the shelves; and
determine the distribution positions of commodities by the directional relationship diagram,
determine a flow corresponding to each directional edge of the directional relationship diagram; and
calculate an actual flow of each of the shelves according to the flow corresponding to each directional edge, and obtaining the flow ranking according to the actual flow,
wherein a calculation formula of the actual flow comprises:

$$F = a1 \times b + a2 \times c,$$

where $a1+a2=1$, $b$ is a flow of a shelf itself, and $c$ is a flow flowing into a shelf.

* * * * *